US006628954B1

(12) United States Patent
McGowan et al.

(10) Patent No.: US 6,628,954 B1
(45) Date of Patent: Sep. 30, 2003

(54) SYSTEM, METHOD, AND PROGRAM FOR CONTROLLING ACCESS TO DATA SERVICES BY A SUBSCRIBER UNIT IN A WIRELESS NETWORK

(75) Inventors: Rosemary McGowan, Richardson, TX (US); Ian MaClean, Dallas, TX (US); Donald Keeler, McKinney, TX (US)

(73) Assignee: Nortel Networks Limited, St. Laurent (CA)

( * ) Notice: Subject to any disclaimer, the term of this patent is extended or adjusted under 35 U.S.C. 154(b) by 161 days.

(21) Appl. No.: 09/656,883

(22) Filed: Sep. 7, 2000

Related U.S. Application Data
(60) Provisional application No. 60/152,695, filed on Sep. 7, 1999.

(51) Int. Cl.[7] .................................................. H04Q 7/20
(52) U.S. Cl. ...................... 455/461; 455/433; 455/426; 455/555
(58) Field of Search ................................ 455/461, 418, 455/419, 432, 433, 434–435, 445, 426, 555, 554, 411, 405; 709/205, 217; 370/352, 356, 466, 335; 379/207.2, 201.02, 201.08, 201.12, 207.11

(56) References Cited

U.S. PATENT DOCUMENTS

| | | | | |
|---|---|---|---|---|
| 5,862,334 A | * | 1/1999 | Schwartz | 709/223 |
| 5,890,064 A | * | 3/1999 | Widergen | 455/445 |
| 6,044,274 A | * | 3/2000 | Vo | 455/461 |
| 6,115,737 A | * | 9/2000 | Ely et al. | 709/203 |
| 6,160,874 A | * | 12/2000 | Dickerman et al. | 379/114.19 |
| 6,167,040 A | * | 12/2000 | Haeggstrom | 370/352 |
| 6,320,873 B1 | * | 11/2001 | Nevo et al. | 370/466 |
| 6,434,140 B1 | * | 8/2002 | Barany et al. | 370/352 |

* cited by examiner

Primary Examiner—Nay Maung
Assistant Examiner—John J Lee
(74) Attorney, Agent, or Firm—John D. Crane; Randall Mishler; Bracewell & Patterson, L.L.P.

(57) ABSTRACT

An improved method and system for accessing wireless data services that reduce messaging and enable roaming subscribers to access data services are described. A wireless communication system in accordance with the present invention includes at least a service control point and a gateway system (e.g., a Gateway Generalized Packet Radio Service Serving Node (GGSN)) that is coupled to a data network. To obtain access to data services, a wireless subscriber unit establishes communication with a gateway system and requests data services from the gateway system. In response to the request, the gateway system queries the service control point regarding authorized data services for the subscriber unit. If the gateway system receives a negative reply from the service control point, then the gateway system denies access to the data services by the subscriber Unit. However, if the gateway system receives a positive reply from the service control point, then the gateway system enables access to the data services by the subscriber unit. In a preferred embodiment, the gateway system tracks the requested data services utilizing pre-defined resource units. In one embodiment, the gateway system tracks service utilization by periodically querying and receiving a reply from the service control point after each pre-defined resource unit has been utilized. In this embodiment, the service control point updates an account balance of remaining resource units in response to receiving the queries and informs the gateway system when data access should be denied.

29 Claims, 4 Drawing Sheets

SYSTEM, METHOD, AND PROGRAM FOR CONTROLLING ACCESS TO DATA SERVICES BY A SUBSCRIBER UNIT IN A WIRELESS NETWORK

This application claims the benefit of Provisional application Ser. No. 60/152,695, filed Sep. 7, 1999.

BACKGROUND OF THE INVENTION

1. Technical Field

The present invention relates in general to communication services, and, in particular, to a system, method, and program for providing communication services in a wireless network. Still more particularly, the present invention relates to a system, method, and program for controlling access to and invocation of data services in a wireless network.

2. Description of the Related Art

Over the last several years, wireless or mobile communication has proliferated throughout the world, and usage of digital and cellular services for voice and data communication has been on the rise. The popularity of wireless communication services has driven communication service providers to develop and provide various new services and features for their subscribers.

One such service is pre-paid wireless communication service for voice or data. To obtain pre-paid services, a subscriber purchases communication services in advance of use. Following payment, the service provider permits the subscriber to utilize communication services and electronically tracks subscriber usage (e.g., by time or data throughput) to maintain a running balance in the subscriber's account. If the balance reaches zero (or other predefined threshold), the service provider terminates the subscriber's access to the communication services until the subscriber pre-pays for additional communication services.

Figure 1:
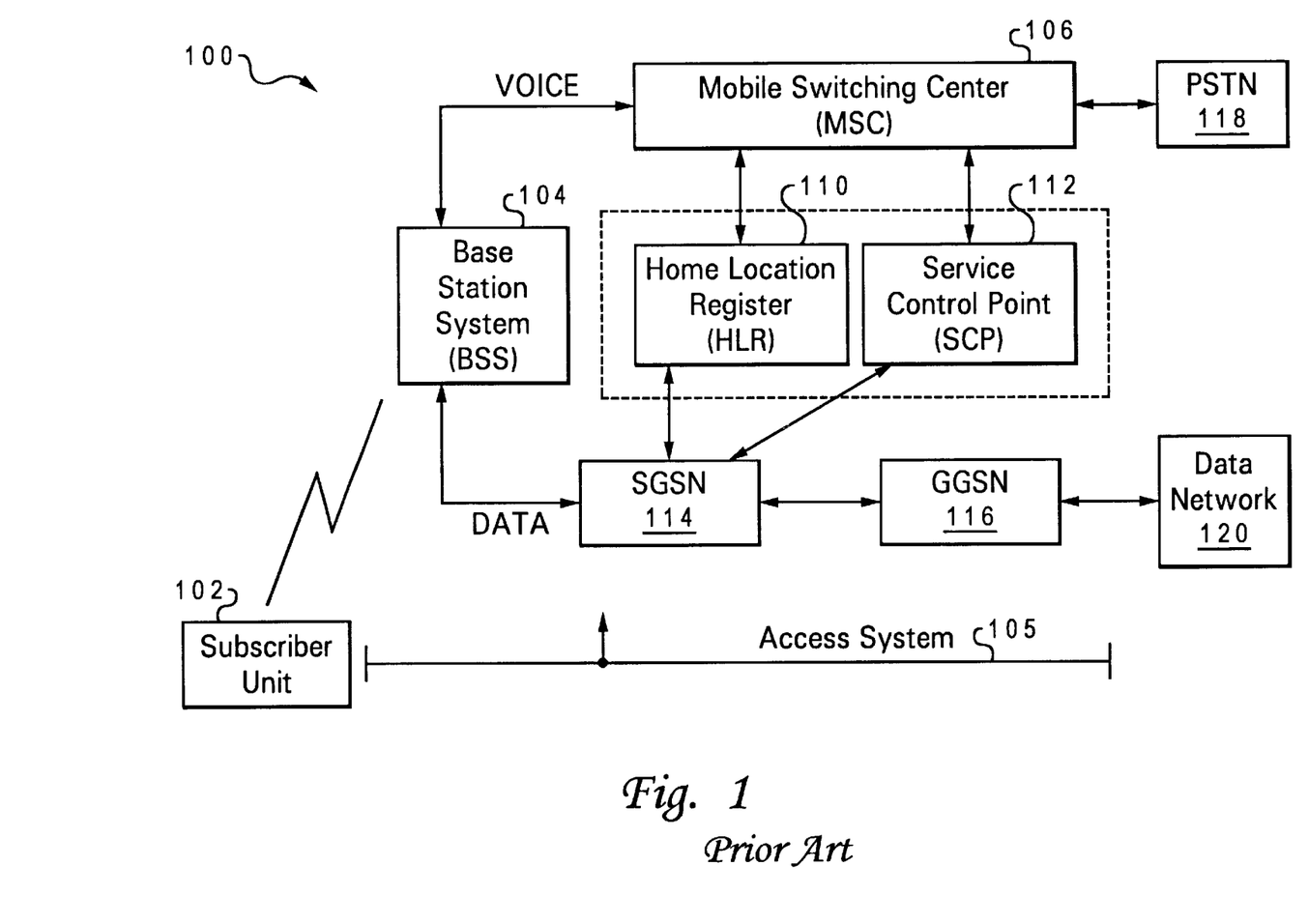
FIG. 1 is an exemplary block diagram of a wireless communication system that provides pre-paid data services to a subscriber in accordance with the prior art.

With reference now to FIG. 1, a block diagram of a conventional Generalized Packet Radio Service (GPRS) wireless communication system 100 that provides pre-paid data services to a subscriber of pre-paid data services is shown. Wireless communication system 100 includes a subscriber unit 102 and an access system 105, which provides subscriber unit 102 with access to public switched telephone network (PSTN) 118 and data network 120. Access system 105 includes a base station system (BSS) 104, a mobile switching center (MSC) 106, a home location register (HLR) 110, a service control point (SCP) 112, at least one serving GPRS support node (SGSN) 114, and at least one gateway GPRS support node (GGSN) 116. MSC 106 controls access to voice communication services by subscriber unit 102, and SGSN 114 and GGSN 116 control access to data communication services by subscriber unit 102. While GGSN 116 may be in the subscriber's home network or a visited network, the HLR 110 and SCP 112 that interact with SGSN 114 to provide subscriber unit 102 with access to pre-paid data services are always located in the subscriber's home network, as indicated by dashed line illustration. Although the subscriber's home network will also likely include an MSC, BSS, and SGSN, the BSS, MSC, and SGSN involved in providing the subscriber with access to pre-paid data services belong to the network in which subscriber unit 102 is physically located, and therefore may or may not be in the subscriber's home network depending upon whether the subscriber is roaming.

To obtain communication services, subscriber unit 102 first initiates communication with access system 100 by performing an attach procedure initiated by turning on subscriber unit 102. In response to subscriber unit 102 attaching, SGSN 114 queries HLR 110 to obtain the subscriber's profile, which identifies services and features available to the subscriber. Subscriber unit 102 then sends to BSS 104 a request to establish data communication with data network 120. BSS 104 in turn forwards the request to SGSN 114, which utilizes the previously obtained subscriber profile to determine whether or not to enable the requested access. If required, SGSN 114 queries SCP 112 regarding whether or not to enable subscriber unit 102 to access pre-paid data services. In response to this query, SCP 112 determines whether or not the subscriber has subscribed to pre-paid data services and has a sufficient account balance to permit access. SCP 112 then sends a reply to SGSN 114 in answer to the query. If SGSN 114 receives a negative reply from SCP 112, then SGSN 114 denies access to pre-paid data services by subscriber unit 102. However, if SGSN 114 receives a positive reply from SCP 112, then SGSN 114 continues setting up the requested session and forwards the request for data services to GGSN 116. During a session in which pre-paid data services are utilized by subscriber unit 102, SGSN 114 informs SCP 112, via a query, after a unit of services has been utilized. SCP 112 processes such queries to track the services utilized by subscriber unit 102 and responds to each query with a reply indicating whether the remaining account balance for subscriber unit 102 is sufficient to allow continued access. If so, SGSN 114 permits the data session to continue. If, on the other hand, the reply from SCP 112 indicates that the subscriber's account balance is too low, SGSN 114 terminates the data session. Thus, SCP 112 controls the data communication session between subscriber unit 102 and data network 220.

The conventional access paradigm for data services illustrated in FIG. 1 is subject to a number of drawbacks recognized by the present invention. First, even though a subscriber has subscribed to pre-paid or other data services in his home network, the subscriber may not be able to access such data services when roaming. This problem arises because, in order for the SGSN 114 of a visited network to inter-operate with the home network's SCP 112 to regulate access to data services, the visited network's SGSN 114 must be configured with appropriate software for each data service. Thus, if the SGSN 114 of the visited network in which subscriber unit 102 is roaming is not configured with the appropriate software, then requested data services cannot be provided to subscriber unit 102. As a result, the ability of subscribers to data services to roam is restricted by the software configurations of the SGSNs 114 with which subscriber unit 102 communicates.

Second, the conventional access paradigm for data services is inefficient in terms of the number of messages (queries and replies) required to support a data session. As subscriber unit 102 is moved within a wireless network, the data session may be handed off between BSSs 204 and SGSNs 114. Because the SGSN 114 is required to regulate access to data services under control of SCP 112, when a handoff occurs the SGSN 114 receiving the handoff must query SCP 112 and receive a reply from SCP 112 in order to obtain state for the data session. The queries and replies resulting from handoff of a data session between SGSNs 114 consume valuable network bandwidth and processing resources.

SUMMARY OF THE INVENTION

In view of the above and other disadvantages of the prior art, the present invention recognizes the need to provide an improved method and system for accessing wireless data services that reduce messaging and enable roaming subscribers to access data services.

In accordance with the present invention, a wireless communication system includes at least a service control point and a gateway system that is coupled to a data network. To obtain access to data services, a wireless subscriber unit establishes communication with a gateway system and requests data services from the gateway system. In response to the request, the gateway system queries the service control point regarding authorized data services for the subscriber unit. If the gateway system receives a negative reply from the service control point, then the gateway system denies access to the data services by the subscriber unit. However, if the gateway system receives a positive reply from the service control point, then the gateway system enables access to the data services by the subscriber unit.

In a preferred embodiment, the gateway system tracks the requested data services utilizing pre-defined resource units. In one embodiment, the gateway system tracks service utilization by periodically querying and receiving a reply from the service control point after each pre-defined resource unit has been utilized. In this embodiment, the service control point updates an account balance of remaining resource units in response to receiving the queries and informs the gateway system when data access should be denied.

The above as well as additional objects, features, and advantages of the present invention will become apparent in the following detailed written description.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF ILLUSTRATIVE EMBODIMENT

Figure 2:
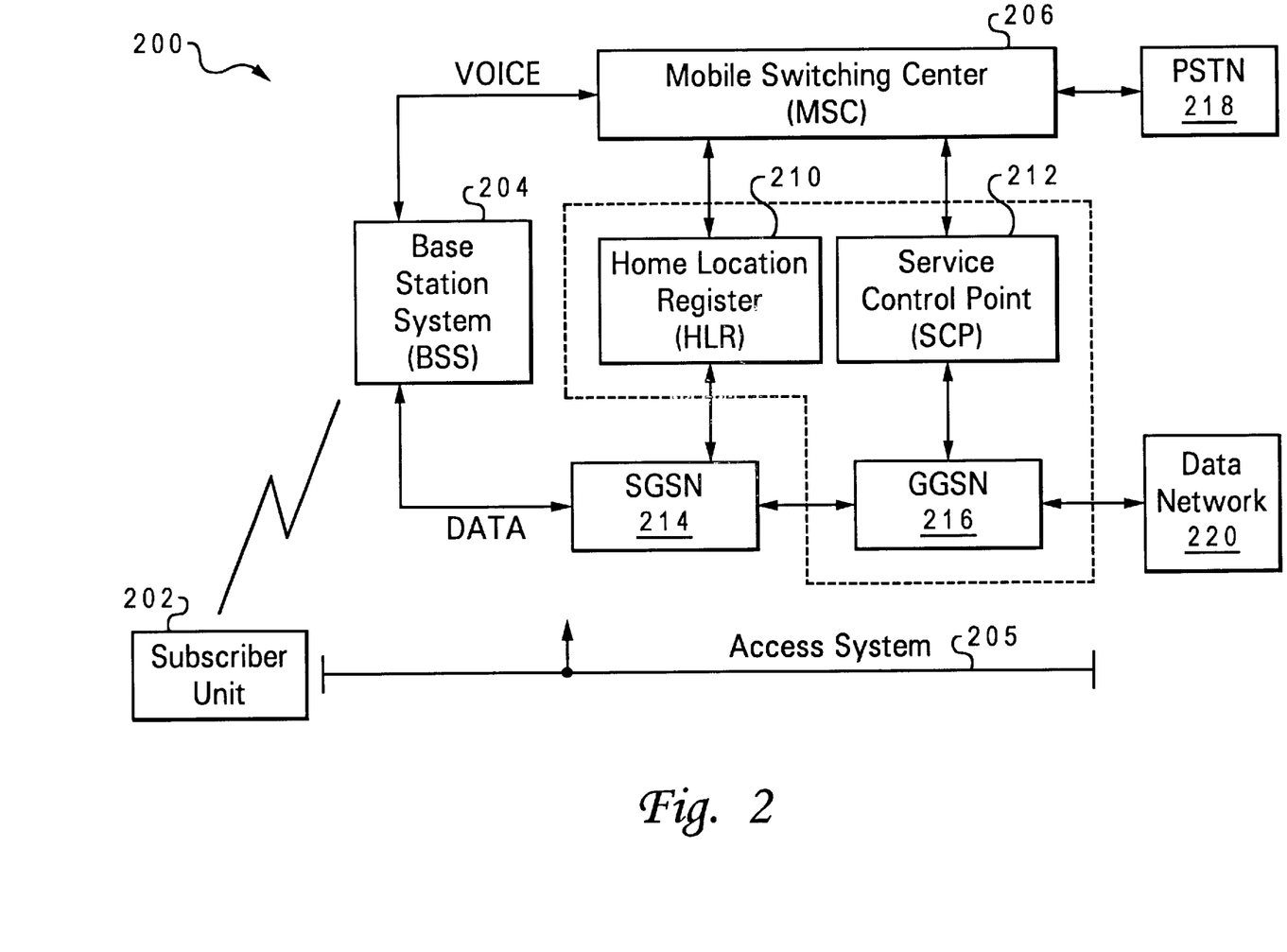
FIG. 2 is an exemplary block diagram of a wireless communication system that provides pre-paid data services to a subscriber in accordance with the present invention.

With reference again to the drawings and in particular with reference to FIG. 2, a block diagram of a wireless communication system 200 in accordance with the present invention is shown. Wireless communication system 200 includes a subscriber unit 202 and an access system 205 that provides both voice access to PSTN 218 and data access to data network 220 (e.g., the Internet or an intranet) for subscriber unit 202. Subscriber unit 202 comprises a wireless communication device, such as a mobile unit, a fixed line access unit, a computing device having wireless communication capability, etc. It will be appreciated from the following description that the present invention is not limited to any particular type of subscriber unit 202.

Access system 205, which in the illustrated embodiment employs the GPRS protocol, includes BSS 204, MSC 206, HLR 210, SCP 212, GGSN 216, and at least one SGSN 214. BSS 204, which generally comprises a base station and associated base station controller, supports data and voice communication over-the-air with subscriber unit 202. As shown, BSS 204 directs voice (i.e., circuit-switched traffic) to MSC 206, which controls the communication of voice calls with PSTN 218 by reference to the subscriber's HLR 210 and possibly SCP 212. Data traffic, on the other hand, is directed by BSS 204 to SGSN 214 and GGSN 216 for service by reference to HLR 210 and SCP 212. As indicated by dashed line illustration, the HLR 210, SCP 212, and GGSN 216 that collaborate to provide subscriber unit 102 with access to data services (e.g., pre-paid access to data network 220) are always located in the subscriber's home network. Although the subscriber's home network will also likely include an MSC, BSS, and SGSN, the BSS, MSC, and SGSN involved in providing the subscriber with access to data services belong to the network in which subscriber unit 202 is physically located, and therefore may or may not be utilized by the subscriber's home network depending upon whether the subscriber is roaming.

SGSN 214, GGSN 216, and SCP 212, which may each be implemented with general-purpose computer systems or special-purpose network hardware, are programmed to provide the processing and communication described herein. In particular, in contrast to the configuration of the prior art system illustrated in FIG. 1, SGSN 214 does not serve as a gatekeeper for data services, but instead forwards data service requests and data packets to GGSN 216 for processing. GGSN 216 is programmed with the triggering and querying behavior that regulates access to data services under the control of SCP 212. As will become clear, this arrangement of functionality provides numerous advantages, including eliminating additional signaling caused by a handoff between SGSNs and enabling the subscriber to access data services while roaming regardless of the software configuration of the visited network's SGSN.

To obtain data services, a subscriber first establishes an account with a service provider (e.g., the owner or operator of access system 205). The terms of the service agreement will indicate what services and features are available to subscriber unit 202 and the terms and conditions governing the provision of services and features. Hereafter, it will be assumed that the subscriber associated with subscriber unit 202 has a service agreement with a service provider to provide pre-paid data service; however, it should be understood that the data services that may be specified by the service agreement are not limited to pre-paid data services, but may also include a specified quality of service (QoS) or other data services.

In order to utilize pre-paid data services, subscriber unit 202 first attaches to access system 205 by performing a GPRS attach in response to the subscriber turning on subscriber unit 202. In response to subscriber unit 202 attaching, BSS 204 notifies SGSN 214, which queries HLR 210 of the subscriber's home network to obtain the subscriber's profile. The subscriber's profile may include the current location of subscriber unit 202 (e.g., cell identifier), an identifier for the subscriber for subscriber unit 202 (e.g., an International Mobile Subscriber Identity (IMSI), an identifying number for subscriber unit 202 (e.g., Mobile Station Integration Services Digital Network (MSISDN)), a connection endpoint for the data session (e.g., the Access Point Name (APN)), and subscriber profile data (e.g., Packet Data Protocol (PDP) context subscription information) that specifies services and features for which the subscriber is eligible. In the present example, the PDP context subscription information indicates that the subscriber has subscribed to pre-paid data services. In addition, the HLR may include a field that informs SGSN 214 to utilize conventional Global System for Mobiles (GSM) roaming support to pass data service requests and data traffic to GGSN 216 in the subscriber's home network so that GGSN 216 is the anchor of the data session.

Following attachment, subscriber unit 202 initiates a PDP context activation by sending an "activate PDP context" request to SGSN 214, which will in turn send a "create PDP context" request to GGSN 216. The PDP "create PDP context" request contains the IMSI, MSISDN, APN, and QoS parameters from the subscriber's profile, as well as other parameters necessary to establish the requested PDP context.

Figure 3:
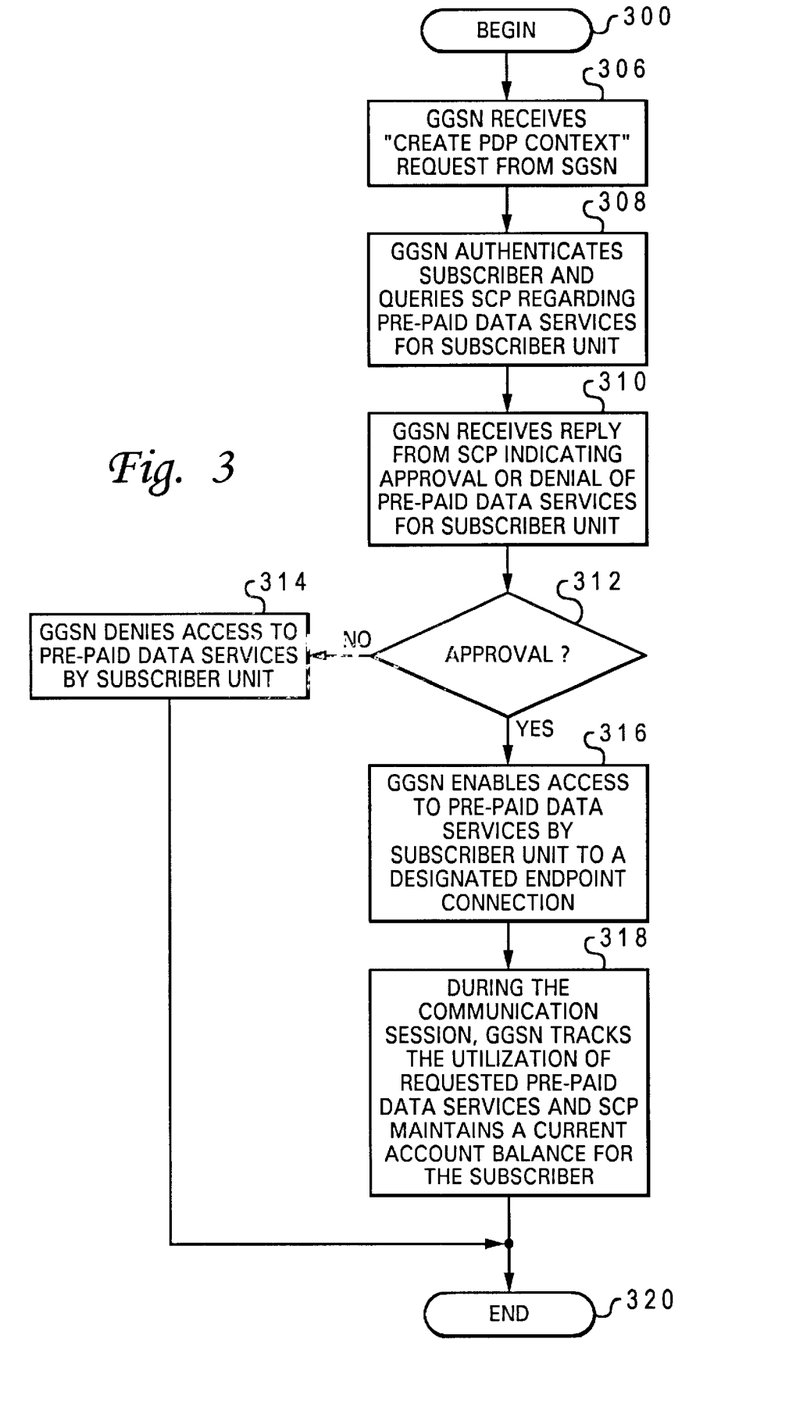
FIG. 3 is a flowchart of an exemplary method and program executed by the gateway system of FIG. 2 to control access to pre-paid data services by a subscriber unit in accordance with the present invention.

Referring now to FIG. 3, there is illustrated a high-level flowchart of an exemplary process and program executed by GGSN 216 of FIG. 2 to control access to pre-paid data services by a subscriber unit in accordance with the present invention. As illustrated, the process begins at block 300 and then moves to block 306, which depicts GGSN 216 in the subscriber's home network receiving the "create PDP context" request from SGSN 114 in the serving network. In response to receipt of the "create PDP context" request, GGSN 216 performs normal procedures for context establishment for subscriber unit is 202, including authentication of the subscriber, as shown at block 308.

GGSN 216 does not contain any information identifying individual subscribers, but instead stores information associated with data connection endpoints (e.g., APN). Thus, in order to distinguish between requests for different data services, GGSN 216 can be provisioned with a special APN for pre-paid data services. For example, a subscriber may normally use the APN "www.abc-isp.com" to access an Internet Service Provider (ISP) network. However, if the subscriber wishes to use pre-paid data services, the APN "www.prepaid-abc-isp.com" may be utilized instead. Thus, GGSN 216 can utilize the APN of the "create PDP context" request to distinguish requests to utilize pre-paid data services.

At block 308, GGSN 216 also issues a query to SCP 212 regarding authorized pre-paid data services for subscriber unit 202. A typical query contains the MSISDN to identify the subscriber and a pre-paid service key to indicate that pre-paid data service is desired. In response to receipt of the query from GGSN 216, SCP 212 verifies whether the subscriber has subscribed to pre-paid data services and has a sufficient account balance for the requested session. SCP 212 then sends a reply to GGSN 216, as shown at block 310, to indicate approval or denial of access to the requested pre-paid data service.

As shown at block 312, GGSN 216 then determines from the reply received from SCP 212 whether or not access to the requested data service is approved. If not, then method 300 proceeds to block 314, which represents GGSN 216 denying provision of pre-paid data service to subscriber unit 202 by sending a negative "create PDP context" response to SGSN 214. SGSN 214, in turn, sends a negative "activate PDP context" response to subscriber unit 202. Thereafter, the process terminates at block 320.

Returning to block 312, if the reply received from SCP 212 by GGSN 216 indicates approval of the requested access to pre-paid data services, then GGSN 216 enables access to pre-paid data services by subscriber unit 202 to a designated endpoint connection (e.g., the specially designated APN), as shown at block 316. GGSN 216 signals approval of the requested access by sending a "create PDP context" response to SGSN 214, which updates its PDP context table and confirms the activation of the new PDP context to subscriber unit 202 with an "activate PDP context accept" message. Subscriber unit 202 can then communicate data with data network 220 via SGSN 214 and GGSN 216. As depicted at block 318, during the data session GGSN 216 tracks the utilization of pre-paid data services in pre-defined resource units (e.g., time, data throughput, or monetary value) and reports the utilization to SCP 212 via regular queries. In response to such queries, SCP 212 updates a current account balance of remaining resource units for subscriber unit 202 and issues replies to GGSN 216 indicating whether the account balance is non-zero. The method illustrated in FIG. 3 thereafter terminates at block 320.

Figure 4:
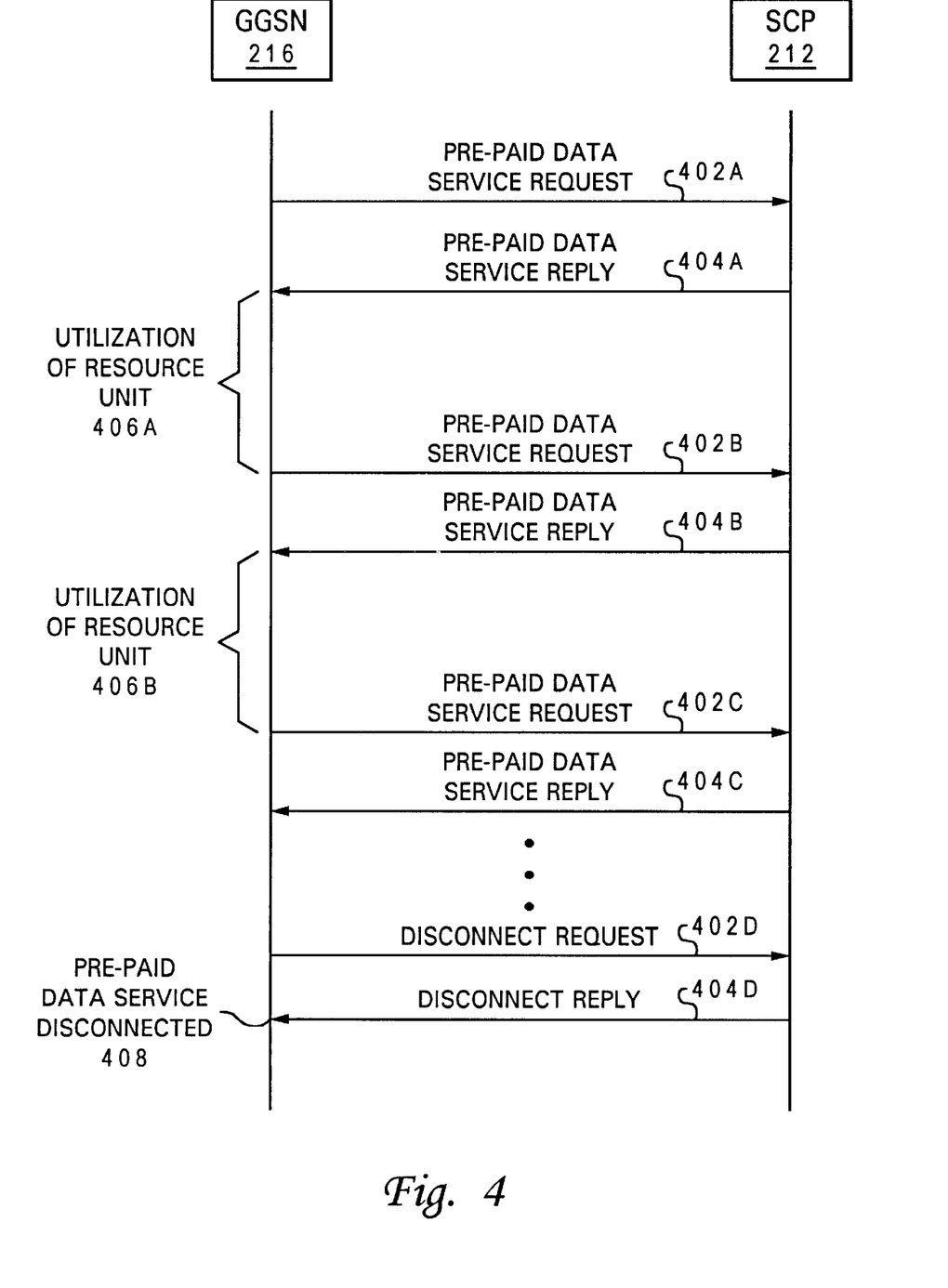
FIG. 4 is a process flow illustrating communication between a gateway system and a service control point in accordance with the present invention.

With reference now to FIG. 4, the communication between GGSN 216 and SCP 212 utilized to establish a data session and track service utilization is illustrated in greater detail. As described above with respect to block 308 of FIG. 3 and as shown at reference numeral 402a of FIG. 4, GGSN 216 first sends a pre-paid data service request to SCP 212. Exemplary content of request 402a is summarized below in Table I.

TABLE I

| MESSAGE FIELDS | VALUE | COMMENTS |
|---|---|---|
| MSISDN | | ID for subscriber |
| SERVICE KEY | Pre-paid data services | Identifies requested data service |
| DATA | 0 | Set to zero for initial request |
| TIME | 0 | Set to zero for initial request |
| QUERY REASON | Session request | Indicates reason for query |

After GGSN 216 sends request 402a, GGSN 216 may start a timer to track the time that has elapsed while waiting for a reply from SCP 212. If a first pre-programmed period has elapsed, then GGSN 216 may retry the request. If a second pre-programmed period has passed, then GGSN 216 may reject the request for pre-paid services by subscriber unit 202.

Once SCP 212 determines whether or not to approve access to pre-paid data services by subscriber unit 202, SCP sends a reply 404a to GGSN 216 as described above with respect to block 310 of FIG. 3. If the reply indicates approval of the requested data session, GGSN 216 begins tracking utilization of data services by the data session. That is, GGSN 216 may set a session timer, begin counting megabytes of data transfer, or track some other metric of service value. Each time that a unit of resource utilization has elapsed during the session, GGSN 216 sends SCP 212 a query (e.g., queries 402b and 402c) to notify SCP 212 that a unit of service has been utilized and determine whether sufficient account balance is available to continue providing access to the pre-paid data services to subscriber unit 202.

Exemplary content for queries 402b and 402c is summarized below in Table II.

TABLE II

| MESSAGE FIELDS | VALUE | COMMENTS |
| --- | --- | --- |
| MSISDN | | ID for subscriber |
| SERVICE KEY | Pre-paid data services | Identifies requested data service |
| DATA | | Zero if service utilization is tracked by time and cumulative data exchanged in session otherwise |
| TIME | | Zero if service utilization is tracked by data and cumulative time elapsed during session otherwise |
| QUERY REASON | Resource unit utilization | Indicates reason for query |

SCP 212 responds to resource utilization queries 402b and 402c by determining whether the account balance of the subscriber is sufficient to continue the data session. A sufficient account balance may be defined by a minimum amount of time, data, or monetary value that must be present in the subscriber's account in order to provide the pre-paid data services. If so, then SCP 212 sends a reply (e.g., replies 404b and 404c) to GGSN 216 that indicates that continued access to pre-paid data services by subscriber unit 202 is allowed. If, however, the account balance is insufficient, SCP 212 sends a reply indicating denial of pre-paid data services to GGSN 216, which responds by disconnecting the data session.

SCP 212 may be additionally programmed to send an "in session" notification to subscriber unit 202 when the amount of resources in the subscriber's account is nearing or has reached a pre-defined threshold account balance. After receiving the notification, the subscriber can then take appropriate steps to re-charge the account by purchasing additional services (e.g., by supplying a credit card number). SCP 212 may further be programmed to allow pooling of multiple account balances (e.g., allow pooling of voice and data minutes).

Referring again to FIG. 4, when the subscriber utilizing subscriber unit 202 closes the data session, GGSN 216 sends a disconnect request 402d to SCP 212. Exemplary content of disconnect request 402d is summarized below in Table III.

TABLE III

| MESSAGE FIELDS | VALUE | COMMENTS |
| --- | --- | --- |
| MSISDN | | ID for subscriber |
| SERVICE KEY | Pre-paid data services | Identifies requested data service |
| DATA | | Zero if service utilization is tracked by time and cumulative data exchanged in session otherwise |
| TIME | | Zero if service utilization is tracked by data and cumulative time elapsed during session otherwise |
| QUERY REASON | Session termination request | Indicates reason for query |

In response to receipt of the disconnect request, SCP 212 updates the subscriber's account balance and replies to disconnect request 402d by sending a disconnect reply 404d to GGSN 216. In response to receiving disconnect reply 404d, GGSN 216 terminates the data session as shown at reference numeral 408 and removes the PDP context from its context table.

As has been described, the present invention provides an improved method and system for accessing data services from a subscriber unit in a wireless network. In accordance with the present invention, the triggering and querying functions utilized to detect a request for and to regulate access to data services are implemented in the GGSN (also referred to herein as a gateway system) in the subscriber's home network. The GGSN of the home network also anchors any data session setup for the subscriber unit, regardless of whether or not the subscriber unit is roaming. As a result, a roaming subscriber can always access data services regardless of the capabilities and software configuration of the visited network's SGSN (also referred to herein as a serving system). In addition, because the GGSN anchors the data session rather than the SGSN, no additional signaling to the SCP is generated by a handoff between SGSNs during the data session.

While the invention has been particularly shown and described with reference to a preferred embodiment, it will be understood by those skilled in the art that various changes in form and detail may be made therein without departing from the spirit and scope of the invention. For example, although the present invention has been described with respect to an illustrative embodiment of a wireless communication network that employs the GPRS protocol, the present invention is not limited to use with the GPRS protocol, but is instead widely applicable to any communication standard that supports data services. In addition, it should be understood that pre-paid data services are only one exemplary application of the present invention and that the principles of the present invention may also be utilized to control access to other data services. Furthermore, although aspects of the present invention have been described with respect to a data processing system executing software that directs the functions of the present invention, it should be understood that present invention may alternatively be implemented as a program product for use with a data processing system. Programs defining the functions of the present invention can be delivered to a data processing system via a variety of signal-bearing media, which include, without limitation, non-rewritable storage media (e.g., CD-ROM), rewritable storage media (e.g., a floppy diskette or hard disk drive), and communication media, such as digital and analog networks. It should be understood, therefore, that such signal-bearing media, when carrying or encoding computer readable instructions that direct the functions of the present invention, represent alternative embodiments of the present invention.

What is claimed is:

1. A method for controlling access to data services by a subscriber unit in a wireless network, said method comprising:

establishing communication over the air between a subscriber unit and a gateway system for a data network via a base station system and a serving system coupled between said base station system and said gateway system, wherein said communication between said subscriber unit and said gateway system is exclusive of any mobile switching center;

the gateway system querying a service control point regarding authorized data services for the subscriber unit, said querying being made independently of any mobile switching center; and     in response to receipt of a reply from the service control point authorizing access to data services, the gateway system permitting access to requested data services in the data network by the subscriber unit via the gateway system and independently of any mobile switching center.

2. The method according to claim 1, and further comprising:
   tracking at the gateway system the requested data services utilized by the subscriber unit.

3. The method according to claim 2, and further comprising the gateway system informing the service control point as to utilization of data services.

4. The method according to claim 3, wherein informing the service control point further comprises informing the service control point of a cumulative utilization of data services during a data session.

5. The method according to claim 3, wherein:
   informing further comprises sending a resource utilization query from the gateway system to the service control point after each unit of data services is utilized; and
   said method further comprises providing a reply to the resource utilization query from the service control point to the gateway system that indicates whether continued access to data services is authorized.

6. The method according to claim 5, and further comprising:
   updating a balance of the remaining resource units for the subscriber unit after each of the pre-defined resource units has been counted by the gateway system.

7. The method according to claim 1, and further comprising:
   determining at the service control point whether to authorize or deny access to the data services by reference to an account balance of a pre-paid data service account.

8. The method according to claim 7, and further comprising:
   providing, by the service control point, an insufficient account balance message to the subscriber unit if the account balance falls below a threshold level.

9. The method of claim 1, wherein:
   said gateway system comprises a gateway Generalized Packet Radio Service (GPRS) support node;
   said serving system comprises a serving Generalized Packet Radio Service (GPRS) support node; and
   establishing communication over the air between a subscriber unit and a gateway system comprises establishing communication over the air between a subscriber unit and said gateway GPRS support node via a base station system and said serving GPRS support node.

10. An access system, comprising:
    a gateway system that, responsive to a request for access to a data service by a subscriber unit in a wireless network, issues a query to a service control point regarding authorization of access to the data service by a subscriber unit and controls provision of the data service in response to a reply thereto, wherein said gateway system communicates with said subscriber unit and said service control point and provides access to requested data services of a data network to said subscriber unit exclusively of any mobile switching center; and
    a serving system having a first data connection to a base station system supporting over-the-air communication with said subscriber unit and a second data connection to said gateway system, wherein said serving system, responsive to receipt at said first data connection of subscriber communication including said request from said subscriber unit, forwards said subscriber communication to said gateway system via said second data connection.

11. The system according to claim 10, and further comprising the service control point, wherein the service control point, responsive to the query, determines whether to authorize access to the data service and indicates an outcome of the determination in the reply.

12. The system according to claim 11, the gateway system further comprising means for informing the service control point of utilization of the data service by the subscriber unit.

13. The system according to claim 12, wherein the means for informing the service control point comprises means for informing the service control point of a cumulative utilization of the data service during a data session.

14. The system according to claim 12, wherein:
    said means for informing further comprises means for sending a resource utilization query from the gateway system to the service control point after each unit of data services is utilized; and
    said service control point comprises means for providing a reply to the resource utilization query to the gateway system that indicates whether continued access to data services is authorized.

15. The system according to claim 14, wherein the service control point further comprises:
    means for updating a balance of the remaining resource units for the subscriber unit after each of the pre-defined resource units has been counted by the gateway system.

16. The system according to claim 11, wherein the service control point further comprises:
    means for determining whether to authorize or deny access to the data services by reference to an account balance of a pre-paid data service account.

17. The system according to claim 16, wherein the service control point further comprises:
    means for providing an insufficient account balance message to the subscriber unit if the account balance falls below a threshold level.

18. The access system of claim 11, and further comprising a mobile switching center that services voice calls of the subscriber unit.

19. The system according to claim 10, further comprising a home location register containing a subscriber profile of a subscriber associated with the subscriber unit.

20. The system according to claim 10, wherein the gateway system supports a plurality of data services including the data service, and wherein each of the plurality of data services has an associated one of a plurality of connection endpoint designations, and wherein said gateway system includes triggering means for initiating said query regarding access to the data service in response to detecting an associated connection endpoint designation in the request from the subscriber unit.

21. The system according to claim 10, wherein the gateway system comprises means for tracking utilization of the data service by the subscriber unit.

22. The system of claim 10, wherein said gateway system comprises a gateway Generalized Packet Radio Service (GPRS) support node and said serving system comprises a serving Generalized Packet Radio Service (GPRS) support node.

23. A program product for controlling access to data services by a subscriber unit in a wireless network, said program product comprising:

a control program, encoded in a computer usable medium, that includes instructions that cause a gateway system to perform the steps of:

communicating over the air with a subscriber unit via a base station system and a serving system coupled between said base station system and said gateway system and exclusively of any mobile switching center;

in response to receipt of a request for access to data service by a subscriber unit, querying a service control point regarding authorized data services for the subscriber unit, said querying being made independently of any mobile switching center; and in response to receipt of a reply from the service control point authorizing access to data services, permitting the subscriber unit access to requested data services on a data network via the gateway system and independently of any mobile switching center.

24. The program product according to claim 23, wherein the control program further includes instructions that cause the gateway system to establishing a data session for the subscriber unit via a serving system interposed between the gateway system and the subscriber unit.

25. The program product according to claim 23, wherein the control program further includes instructions for causing the gateway system to perform the step of:

tracking the data services utilized by the subscriber unit.

26. The program product according to claim 25, wherein the control program further includes instructions for causing the gateway system to perform the step of informing the service control point as to utilization of data services.

27. The program product according to claim 26, wherein the instructions for causing the gateway system to inform the service control point comprise instructions for causing the gateway system to inform the service control point of a cumulative utilization of data services during a data session.

28. The program product according to claim 26, wherein:

the instructions for causing the gateway system to inform the service control point comprise instructions for causing the gateway system to send a resource utilization query from the gateway system to the service control point after each unit of data services is utilized; and said control program further comprises instructions for causing the gateway system to allow continued access to data services by the subscriber unit only in response to receipt of a reply to the resource utilization query from the service control point indicating that continued access to data services is authorized.

29. The program product of claim 23, wherein:

said gateway system comprises a gateway Generalized Packet Radio Service (GPRS) support node;

said serving system comprises a serving Generalized Packet Radio Service (GPRS) support node; and said instructions that cause said gateway system to perform the step of communicating over the air with a subscriber unit comprise instructions that causes said gateway GPRS support node to communicate over the air with said subscriber unit via a base station system and said serving GPRS support node.

* * * * *